(12) United States Patent
McLeod

(10) Patent No.: US 10,808,387 B2
(45) Date of Patent: Oct. 20, 2020

(54) REMOVABLE TRAP WITH LATCH CLAMPS

(71) Applicant: Christopher Adam McLeod, Toronto (CA)

(72) Inventor: Christopher Adam McLeod, Toronto (CA)

(73) Assignee: Christopher Adam McLeod, Toronto, Ontario (CA)

( * ) Notice: Subject to any disclaimer, the term of this patent is extended or adjusted under 35 U.S.C. 154(b) by 0 days.

(21) Appl. No.: 15/653,490

(22) Filed: Jul. 18, 2017

(65) Prior Publication Data

US 2019/0024356 A1    Jan. 24, 2019

(51) Int. Cl.
| | |
|---|---|
| *E03C 1/30* | (2006.01) |
| *E03C 1/284* | (2006.01) |
| *E03F 5/04* | (2006.01) |
| *F16L 3/10* | (2006.01) |
| *E03C 1/26* | (2006.01) |

(52) U.S. Cl.
CPC ............... *E03C 1/30* (2013.01); *E03C 1/284* (2013.01); *E03F 5/0407* (2013.01); *F16L 3/1008* (2013.01); *E03C 1/26* (2013.01)

(58) Field of Classification Search
CPC ........................................ E03C 1/30
USPC ............................................................ 4/679
See application file for complete search history.

(56) References Cited

U.S. PATENT DOCUMENTS 2,593,734 A * 4/1952 Davis ..................... E03C 1/284
137/247.51
4,700,412 A * 10/1987 Manuel ................... B01D 36/04
137/247.51

* cited by examiner

*Primary Examiner* — Lauren A Crane
(74) *Attorney, Agent, or Firm* — Perry + Currier Inc.; Matthew J. Marquardt

(57) ABSTRACT

A removable trap for lavatory sinks is provided to enable new technologies to be incorporated into just the water trap portion of the sink trap to maximize the performance of the trap in infection control, while at the same time preserving the trap performance features demanded by major building codes. While a traditional P-trap requires the removal of the entire trap for cleaning or replacement, the removable trap presented in this application allows for easy removal of just the U-bend portion of the trap by releasing latch clamps. The U-bend containing the water is the most vulnerable to attack to cleaning chemicals as well as the most effective locus of innovation in materials and methods employed to reduce infectious bacteria forming biofilms within the lavatory trap.

13 Claims, 3 Drawing Sheets

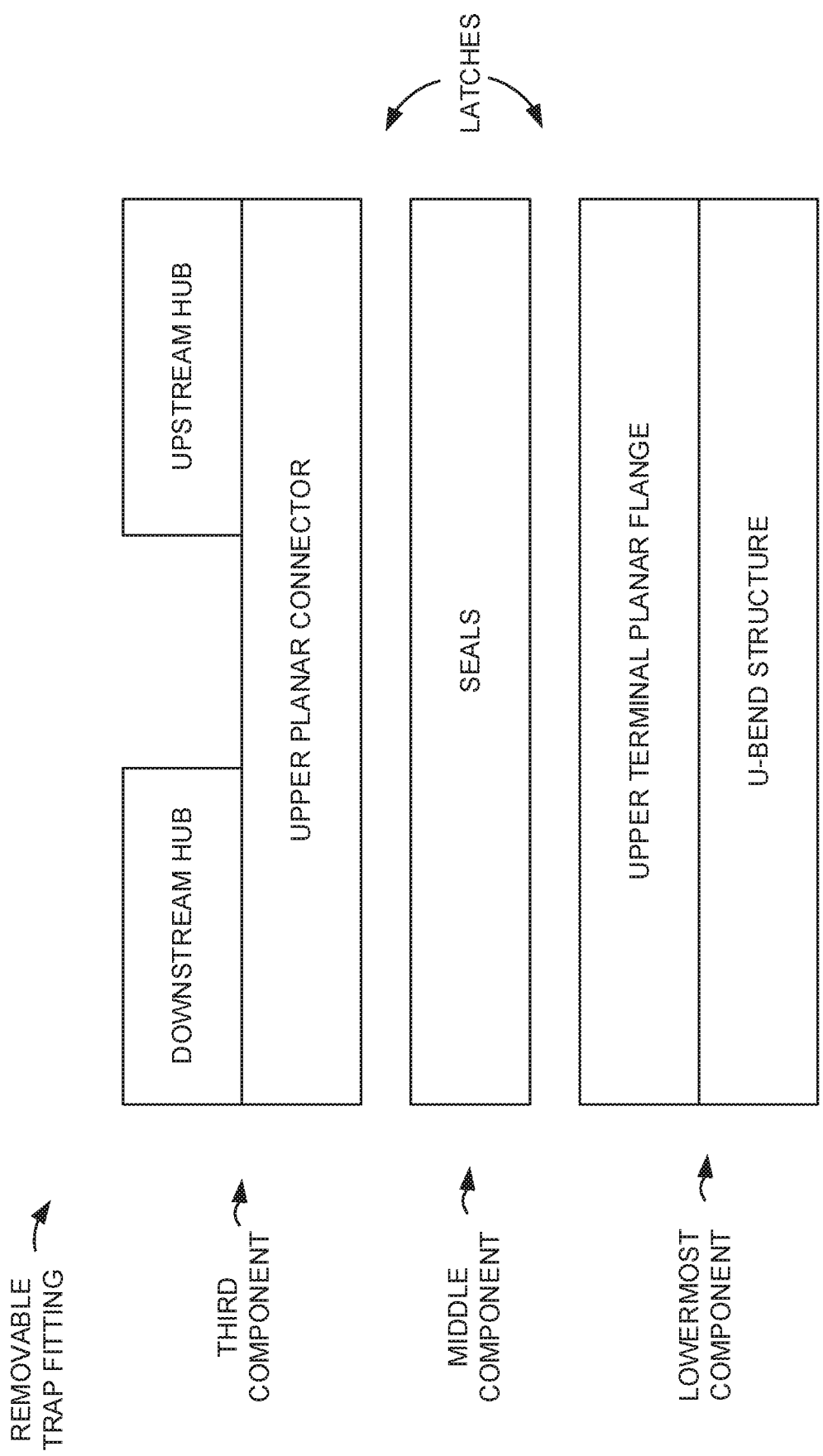

REMOVABLE TRAP WITH LATCH CLAMPS

CROSS-REFERENCE TO RELATED APPLICATIONS

No cross reference is made to other applications.

STATEMENT REGARDING FEDERALLY SPONSORED RESEARCH OF DEVELOPMENT

No Federal Government support was received in the development of this Invention.

SEQUENCE LISTING, TABLE, OR COMPUTER PROGRAM LISTING

No sequence listing, table, or computer program is attached or accompanies this Application.

FIELD OF THE INVENTION

This Invention relates generally to trap fittings connected to lavatory sinks, and more particularly to traps fitted to lavatory sinks in infection control environments.

BACKGROUND OF THE INVENTION

Traps in plumbing are devices to contain sewer gas from rising from a municipal or septic tank sewage system up into a plumbed building via the drain hole on washing vessels. Usually gas ingress is halted by the trapping of a quantity of water between a vessel drain and a sewage system, although rubber seal hinged and sprung hatches are also used in less developed nations. Trap systems consist of the vessel they are connected to, as well as the drain fitting connecting a vessel fixture to a drainage pipe, as well as the sealing connecting assemblies that connect the drainage pipe to a trap fitting, and finally a waste arm leading to a vented vertical drainage pipe or "stack" connecting and draining many fixtures. The vessel of interest in this Application is called a lavatory or sink or even lavatory sink, all three names referring to a hand-washing sink. The lavatory sink is secured to a wall or counter and equipped with pressurized supply water fittings terminating in a faucet or faucets that supply water to the lavatory interior. The environment of interest in this Application is the infection control environment, for example, hospitals. The first line of infection management in infection control is the elimination, where possible, of uncleanable niches for microbes. Accordingly, internal overflow channels found in older household bathroom sinks are contraindicated for infection control environments, owing to restricted access for cleaning of the overflow channel. Consequently, overflow channels will not be addressed in this Application. The fixture fitting attached to the bottommost hole draining the vessel is called the drain or lavatory drain, and to the bottommost extremity of said drain is connected a tailpiece constructed of tubular metal or plastic and connecting to a downstream trap. In some installations accommodating wheelchairs under the lavatory, the tailpiece may be replaced by an elbow connected to a horizontal tube of metal or plastic connected eventually to a downstream trap. In either case, downstream of the trap is a horizontal waste arm comprised of tubular plastic or metal leading to the larger drainage system. Trap design has evolved greatly in order to achieve two objectives. The first objective is the containment of sewer gases over the service life of the trap. The second is to be cleanable. Current to the date of this Application, most traps in North America are required by building codes to be a tubular trap constructed of tubular plastic or metal bent into form and connected with various connection and sealing assemblies. Colloquially, a tubular trap assembly made of tubular metal or plastic connected to a lavatory is called a "P-trap" owing to its similarity in shape to the letter p in a horizontal position. The portion of the tube bent 180 degrees is referred to as the "J-bend" owing to one arm of this part being higher than the other. Critical in the J-bend is the air gap between the two upward tubular arms of the bended part, and the height of said gap. In contrast, a trap part comprising tube bend 180 degrees at the tube midpoint to form two upward arms of equal length would be called a "U-bend". Other manufacturing methods of the U-bend, such as casting, moulding, and forging may be preferable or necessary.

In this Invention called the removable trap for lavatory sinks, the traditional trap fitting system is modified to maintain said sewer gas control while enabling the provision of a removable tubular water trap portion for thorough cleaning or replacement. Easy removal of said trap portion has hitherto been impossible if the first functional objective of reliable sewer gas containment were to be maintained. The Invention described in this Application is able to meet both said objectives.

Through the provision of said objective of containing sewer gases and provision of said objective of cleanability through replaceability of the tubular trap part of the trap, the Invention described in this Application can be used as a tool to manage infectious microorganisms in an infection control environment. Lavatories are principally used for hand washing. Repeated use to wash hands, as well as the introduction of other biological refuse, can lead to build up of biofilm plaques containing infectious bacteria in the nutrient rich water trapped within the trap fitting. Biofilms are complex adhering structures produced by bacteria that enable differentiation in bacterial functionalities. Said bacteria can splash back up into the sink interior and be vectored onto human hands and other surrounding items, promoting infection where infection would not have occurred without the lavatory. This leads to the ironic situation in that the device, said lavatory, placed at great expense through the hospital to enable medical hygiene through hand-washing, poses the greatest risk of any hospital equipment. The Invention in this Application enables not only thorough cleaning, but elaboration of materials and processes centering around the tubular trap tube cartridge portion only, to concentrate expense on the retaining portion of the trap, said J-bend described earlier. Not only is the trap the origin of most infectious microorganism risk, it is also the portion of the trap system most vulnerable to attack by strong cleaning chemicals used in infection control environments such as hospitals. Rather than sacrificing anti-microbial properties of the trap material for the longevity perceived to be of importance in commercial buildings, the trap J-bend can be viewed as a replaceable item maximized for infection control. In practice, most hospital maintenance staff have anticipated this Invention by the awkward process of periodically replacing the entire trap assembly, a costly and time consuming exercise. The Invention described in this Application will provide an easier way to replace the most important, the most vulnerable, and the most powerful locus of infection management technologies. This strategy is common to medical hygiene, where disposable parts, for example the disposable plastic shroud on an electronic thermometer, are key in infection management. It is time this most Victorian of fittings, the lavatory trap, be adjusted to meet the expectations of modern infection control.

The history of modern trap starts largely with Thomas Crapper in England, who found that vectoring toilet waste with flush water into a tank pit equipped with an overflow prevented the ingress of sewer gas into the household. However, said pit traps posed a cleaning nightmare. Modern interpretations of Crapper's trap to the lavatory sink have generated a variety of patent applications, each illustrating important aspects of trap design. As a sample, Nunez (U.S. Pat. Appln. No. US 2004/0177439, Sep. 16, 2004) provides instead of a P-trap, an egg-shaped receptacle accepting the drainpiece from above and equipped with a waste arm to the side. If the bottom of said tailpiece is inserted such that its bottom end lies below the lowest point of the diameter of the exit port to the waste arm (commonly this lowest exit point downstream to the trap is called the "weir"), Nunez considered that this would be a sufficient barrier to trap gases as well as easy to clean. North American plumbing codes have all rejected this style of trap, called the "bottle trap" owing to its superficial resemblance to a beer bottle, for two reasons. One rejection reason is that siphonage can occur more easily without at least two inches of trap height to the weir. If water is siphoned out of the trap, this can lead to an empty trap, defeating its very purpose. More importantly, it is impossible to visually assess whether the tailpiece from the drain is below the weir by looking at the exterior of the trap. What happens often is that a long tailpiece extended even 2" below a weir will develop perforations above the weir. In this case, gases short circuit the trap, again defeating its very purpose. Bacon (U.S. Pat. Appln. No. US 2009/0308463, Dec. 17, 2009) presents another bottle trap that does indeed have an integral barrier inside to preserve the two inch to weir trap height that resists siphoning. However, there is no way to visually assess that that barrier is not perforated without disassembling it, and even then assessment of the integrity of the integral barrier would be difficult. Bottle traps have therefore been expressedly defined and banned in all building codes in Canada and the United States. Instead, the P-trap is preferred. If one or both walls bounding the gap in the J-bend fail, the trap will leak to the ground, an easy visual test. Further, the gap can be sized to preserve a 2" weir height on the inside of the J-bend to resist siphonage.

The trapping of sewer gases has been stated to be one objective of trap design. The other was cleanability. Ana (U.S. Pat. Appln. No. US 2006/0265804, Nov. 30, 2006) accepts the J-bend and attempts to add a cleanout consisting of a threaded plug and port. The novelty of Ana's application is that the cleanout port is horizontal, provided on the side of the J-bend to more easily accept a cleaning brush. Usually if a threaded clean-out port is provided, it is found on the lowest point of the J-bend. In either case, these tiny cleanout ports are unusable in infection control environments for a variety of reasons, including the unsuitability of any design of brush for cleaning tubes lined with biofilms, and more simply the leaking or corroding of said cleanouts. Beaumont (U.S. Pat. Appln. No. US/2014/0000019, Jan. 2, 2014) present an example of a brushless but high risk cleaning device consisting of a tube connected at the upstream end to water supply, and at the bottom end resting freely in the trap. Independent of its functionality, if the water supply pressure goes negative, as periodically happens, the trap water with its high risk of infectiousness would be directly sucked up into the fresh water supply, with potentially disastrous complications once supply water pressure returns. Any device not equipped with an air gap or other backflow prevention device is strictly illegal. This sort of direct flush can be designed in many ways, all of them strictly forbidden by building codes in Canada and the United States owing to said risk of cross-contamination of potable supply water with infections drainage water. The conclusion from a limited library of trap design applications is that the easiest and safest way to clean a trap is to design a trap that enables the easy and periodic removal of the water-containing 180 degree bend portion of the J-bend. McLeod (U.S. Pat. No. 9,562,349, Feb. 7, 2017) described such a system where by an upper mount was sealingly clamped to a lower U-shaped bend by a thread mate. In this application, sealing between an upper mount and a lower U-shaped bend is achieved with clamping latches.

The removability of a trap enables other tools in fighting infection spread other than regular cleaning enabled by easy replaceability. These tools include enabling concentration of expense of material and methods into the portion of the trap most likely to support biofilm growth. Construction of the U-bend portion out of material that is inherently anti-microbial, for example certain copper alloys, or coated to be anti-microbial, is less expensive for hospitals when only the removable portion receives this special treatment. Processes such as heating can be incorporated just into the U-bend, and improvements made without discarding the entire trap assembly.

In conclusion, the U-bend portion of the lavatory trap system can be constructed of a plurality of plastics, metals, and other materials, using a plurality and possible combination of bending, soldering, welding, injection moulding, die-casting, forging, and other manufacturing methods. The ability to modify just the U-bend allows for easy cleaning, regular replacement, provision of purposeful materials, provision of purposeful technologies all to achieve antimicrobial ends and manage risk of infectiousness.

SUMMARY OF THE INVENTION

Accordingly, it is an objection of this invention to at least partially overcome some of the disadvantages of the prior art.

The Invention, a removable trap for lavatory sinks as described in this Application, is a drainage fitting for the drainage hole of a lavatory sink that includes a tubular portion bent 180 degrees to form a water trap distinguished by a complete gap between the two upward arms of this trap, said two upward arms terminating in a plate perforated to match the two upward tube openings, as well as perforated to maintain the gap between the two arms. The result is a "U-bend". The upper portion of the trap system, called the mount, comprises a connector top that not only secures and seals the downward portion of the drain tailpiece emanating from a plurality of lavatory sink drainage fittings, it provides a lowermost flat plate for an anchoring connection between the drain fitting itself and the U-bend piece. The mount top also provides a horizontal hub for the attachment of a horizontal waste arm. The gap between the two upward arms of the U-bend is preserved by a slot between these two hubs. The connector top is also equipped with a plurality of clamping latched that are designed to engage clamp grips provided in complementary positions around the perimeter of the U-bend top plate in which both ends of the tubular portion of the U-bend terminate. The action of engaging the clamps draws the top of the top plate of the U-bend against the bottom of the bottom plate of the mount, sealing being effected by o-ring or other seals fitted into seal glands (grooves) encircling each upward perforation in the top of the top plate of the U-bend. The fit of the mount and the U-bend, and the clamps, both serve to orientate engagement sealingly.

BRIEF DESCRIPTION OF THE DRAWINGS

In the drawings, which illustrate embodiments of the invention:

FIG. 3 shows a schematic diagram of a removable trap fitting.

DETAILED DESCRIPTION OF THE INVENTION

Figure 1:
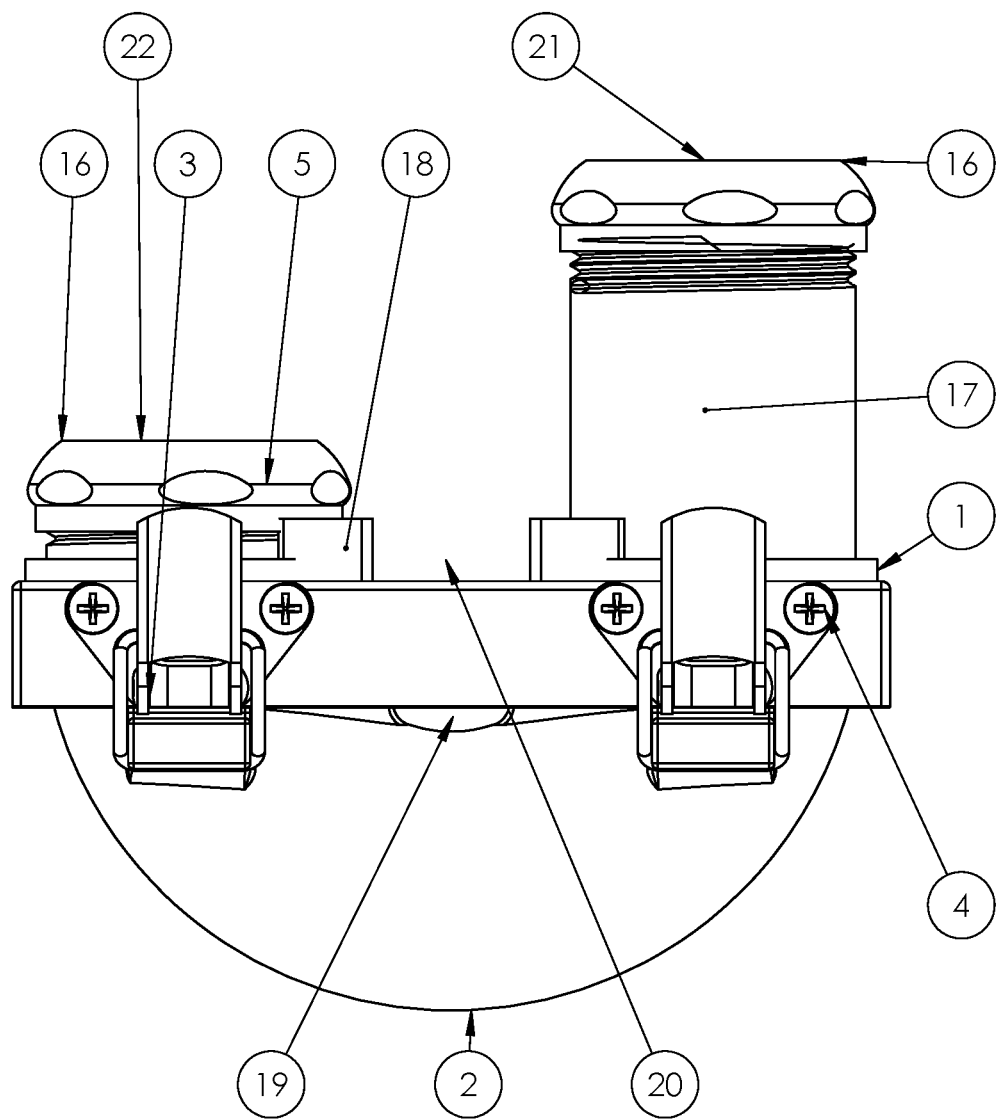
FIG. 1 shows an lateral view of the removable trap system without attachment to sink drain and without attachment to downstream plumbing.

The Invention described in this application is a novel drain fitting for a plurality of drained vessels known as lavatory sinks. An isometric view of the entire removable trap system is shown in FIG. 1. The removable U-bend trap portion 2 terminates in a upmost plate feature which is captured by a plurality of clamps 3 to the upper mount 1. Said mount is adorned with a short downstream stack 18 and a tall upstream stack 17. Each stack supports a hub for attachment. Water ingress occurs at the upstream hub 21, and water egress is through the downstream hub 22. The visual separation between the upstream and downstream portions of the trap is preserved in a gap 19 in the U-bend, and a gap 20 between the upstream and downstream stacks. A nut 16 is provided for cinching a tailpiece descending from the lavatory to which the trap is attached, and a nut 5 cinches a wallbend 6 attaching the trap to downstream plumbing.

Figure 2:
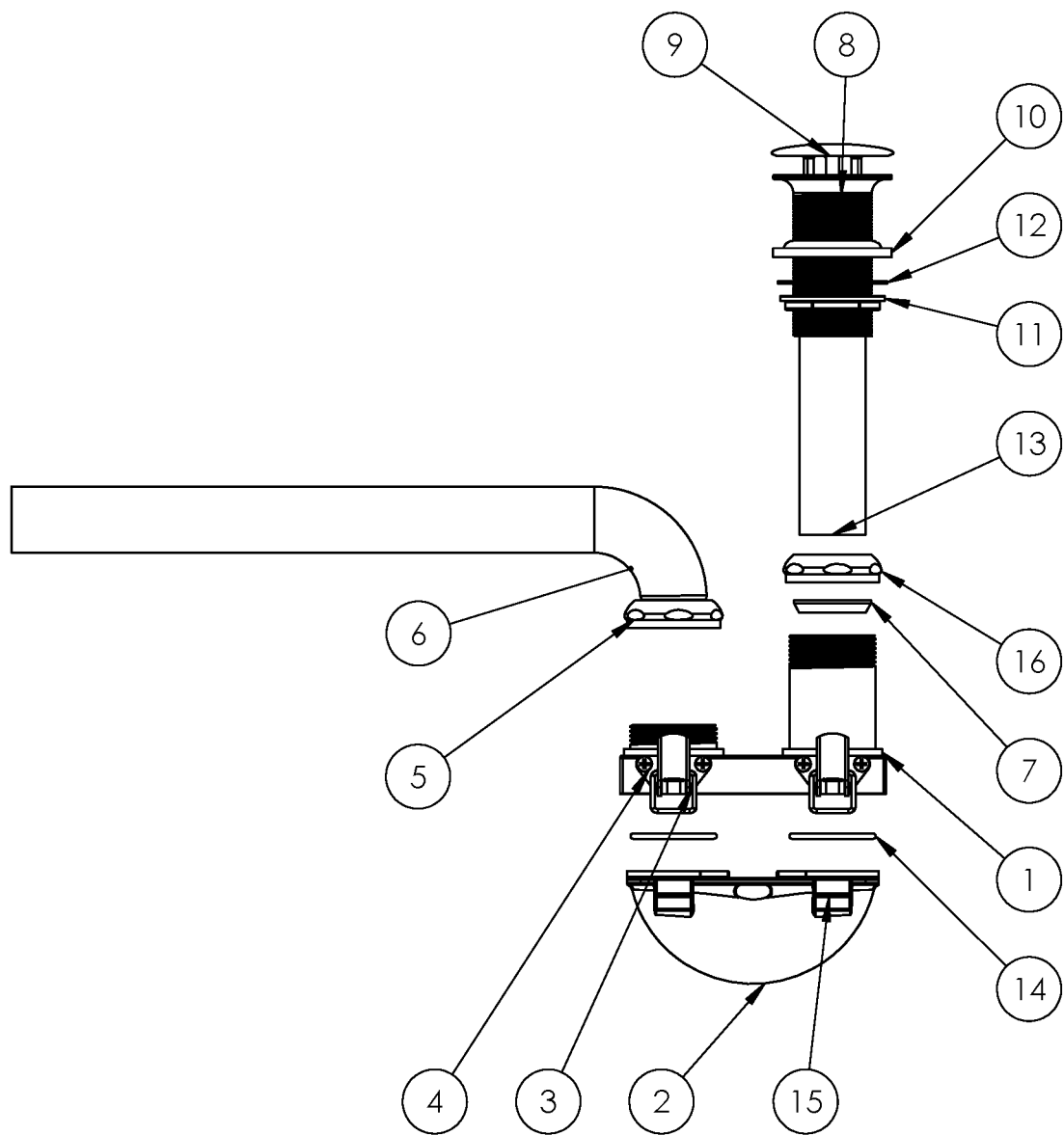
FIG. 2 shows an exploded lateral view of the trap as attached to a lavatory drain.

A lateral exploded view of the same trap is shown in FIG. 2, illustrating attachment to an upstream drain comprising a drain top 9 and a drain plug 8, and illustrating attachment to a downstream wallbend 6 leading to the sanitary drain. Although not part of this invention, the drain plug 8 is secured by passing the drain plug through the sink drainhole, and sealed with a washer 10 engaged by the tightening of a cinching nut 11 enabled by the provision of a slip washer 12. Tightening of the nut 11 will push the seal into the border of the sink drainhole from the underside to form a seal. The downstream end of this drain plug 9 accommodates a tailpiece 13 attached to the bottom of the drain plug 8. The tailpiece 13 is sealed to the upstream stack by means of a seal 7 and a cinching nut 16. Downstream, a wallbend 6 is sealed to the downstream stack by means of another cinching nut 5. The mount 1 for these stacks is clamped tightly to the U-bend portion 2 of the trap assembly by a plurality of clamps 4 affixed to the mount 1 by means of fasteners such as screws 3. The clamps 4 engage a plurality of complementary clamp grips 15. The means of sealing between these two plates are o-rings 14 provided in the top of the upmost plate of the U-bend 2. The o-rings 14 ensure that water passes without leaking from an overlying lavatory, through the drain plug 8, through the tailpiece 13, through the mount 1, around the U-bend 2, through the mount 4 again, and up around the wallbend 6 to discharge into the sanitary drain plumbing system. The o-rings 14 also seal against upstream egress of sewer gas emanating from a downstream sanitary drain.

Thus, a removable trap fitting is provided which includes an assembly of three components clamped together by latches, the lowermost component being an upper terminal planar flange attached to an underlying U-bend structure comprised of tube or tube-shaped material, the middle component being seals, and the third component being an upper planar connector adorned with two hubs on stacks, an upstream hub connecting to a tailpiece emanating from the bottom of the drain fitting attached to the lavatory drain hole, and a downstream hub accepting a waste arm leading eventually to a drainage system.

The invention claimed is:

1. A drain comprising:
a lowermost component being an upper terminal planar flange attached to an underlying removeable U-bend trap having a first opening, a second opening, and a gap between the first and second openings, wherein the first opening is located on the upper terminal planar flange at a first location and the second opening is located on the upper terminal planar flange at a second location,
a middle component being seals; and
a third component being an upper planar connector adorned with two hubs on stacks, wherein the two hubs comprise an upstream hub connecting to a tailpiece emanating from a bottom of the drain fitting attached to a lavatory drain hole and a downstream hub accepting a waste arm leading eventually to a drainage system,
wherein the lowermost component, the middle component, and the third component are clamped together by latches to form a continuous air gap in between the stacks and the gap of the removable U-bend trap, and is unbound by any of the three components from above, the continuous air gap to provide a visual indication of the intactness of a trap weir against upstream transmission of sewer gas, wherein the visual indication is to identify and locate a leak of water of the trap weir.

2. A connector comprising:
a plate having a first opening to an upstream stack and a second opening to a downstream stack, wherein the plate is to engage a first seal of a removable U-bend trap, wherein the first seal is disposed about a first opening of the removable U-bend trap and wherein the plate is further to engage a second seal of the removable U-bend trap, wherein the second seal is disposed about a second opening of the removable U-bend trap, wherein the removable U-bend forms a gap between the first opening and the second opening; and
a first clamp to engage the U-bend trap to create a seal between the upstream stack, the removable U-bend trap, and the downstream stack;
wherein the connector forms a continuous air gap in between the stacks and the gap of the removable U-bend trap, and is unbound by any of the three components from above, the continuous air gap to provide a visual indication of the intactness of a trap weir against upstream transmission of sewer gas, wherein the visual indication is to identify and locate a leak of water of the trap weir.

3. The connector of claim 2, further comprising a first groove disposed in the plate to engage the first seal and a second groove disposed in the plate to engage the second seal.

4. The connector of claim 3, wherein the first seal is a first O-ring and the second seal is a second O-ring.

5. The connector of claim 2, wherein the first clamp is disposed proximate to the downstream stack.

6. The connector of claim 5, further comprising a second clamp disposed proximate to the downstream stack, wherein the first clamp is opposite the second clamp to apply a uniform pressure on the first seal.

7. The connector of claim 6, further comprising a third clamp and a fourth clamp disposed proximate to the upstream stack, wherein the third clamp is opposite the fourth clamp to apply the uniform pressure on the second seal.

8. A drain system comprising:
one or more plates;
an upstream stack to connect to a drainhole;
a downstream stack to connect to a wallbend;
a removable U-bend trap having a first opening and a second opening, wherein the first opening is to communicate with the upstream stack through the one or more plates, the second opening is to communicate with the downstream stack through the one or more plates, and a gap is formed between the first and second openings;
a first seal to be placed between the first opening of the removable U-bend trap and the one or more plates to form a first watertight connection;
a second seal to be placed between the second opening of the removable U-bend trap and the one or more plates to form a second watertight connection;
a first clamp grip disposed on the removable U-bend trap; and
a first clamp to engage the first clamp grip to create a seal between the upstream stack, the removable U-bend trap, and the downstream stack, wherein the drain system forms a continuous air gap in between the stacks and the gap of the removable U-bend trap, and is unbound by any of the three components from above, the continuous air gap to provide a visual indication of the intactness of a trap weir against upstream transmission of sewer gas, wherein the visual indication is to identify and locate a leak of water of the trap weir.

9. The drain system of claim 8, further comprising a first groove disposed at the first opening of the removable U-bend trap to engage the first seal and a second groove disposed in the second opening of the removable U-bend trap to engage the second seal.

10. The drain system of claim 9, wherein the first seal is a first O-ring and the second seal is a second O-ring.

11. The drain system of claim 10, wherein the first clamp is disposed proximate to the upstream stack to apply pressure on the first O-ring.

12. The drain system of claim 11, further comprising a second clamp disposed proximate to the upstream stack, wherein the first clamp is opposite the second clamp to apply a uniform pressure on the first O-ring.

13. The drain system of claim 12, further comprising a third clamp and a fourth clamp disposed proximate to the downstream stack, wherein the third clamp is opposite the fourth clamp to apply the uniform pressure on the second O-ring.

* * * * *